June 9, 1942.  P. J. SCHWEIGHART  2,285,756
SEWER TRAP
Filed March 7, 1941

P. J. Schweighart
INVENTOR.

BY *[signature]*
ATTORNEYS.

Patented June 9, 1942

2,285,756

UNITED STATES PATENT OFFICE 2,285,756

SEWER TRAP

Peter J. Schweighart, Sandusky, Ohio

Application March 7, 1941, Serial No. 382,240

2 Claims. (Cl. 182—16)

This invention relates to sewer trap construction, the primary object of the invention being to provide a sewer trap which will operate under pressure in one direction, to release gas, and to close under pressure in the opposite direction to prevent operation of the closure of the trap, until a predetermined gas pressure is built up at one side of the trap.

Another object of the invention is to improve generally the construction as set forth in my Patent No. 2,174,332, in that the spider shown in my former patent has been eliminated, and a bracket employed for supporting the spring that acts to move the closure in one direction.

Still another object of the invention is to provide a body portion in the form of a supporting ring, which is provided with a flange to be fitted over one end of the pipe, with which the trap is used, thereby preventing the trap from being moved inwardly by gas pressure in the pipe-line.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
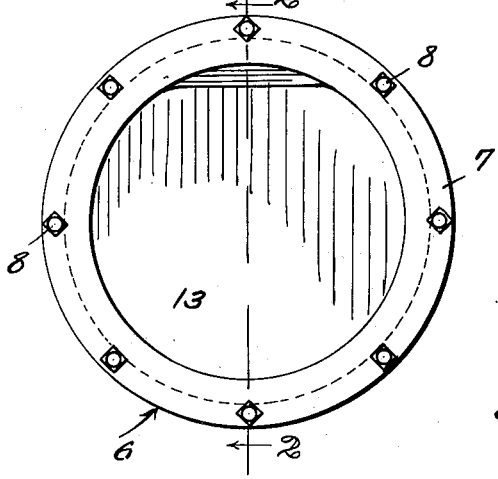
Figure 1 is a front elevational view of the trap as positioned in a pipe.

Referring to the drawing in detail, the reference character 5 designates the pipe in which the sewer trap, forming the subject matter of the present invention, is positioned. The sewer trap comprises a circular body portion indicated generally by the reference character 6, the body portion being in the form of a ring which is of a diameter to fit within the pipe in which the sewer trap is positioned. A flange indicated at 7 is formed at one end of the body portion 6, and is of a diameter to overlie the end of the pipe with which the sewer trap is used, the flange being provided with openings to receive the bolts 8, whereby the body portion may be secured to the end of the pipe. In order that a gas-tight connection will be provided between the sewer trap and the pipe with which it is used, a gasket indicated at 9 is positioned between the inner surface of the flange 7 and end of the pipe, as clearly shown by Figure 2 of the drawing.

Extending from the body portion 6, is a bracket including an arm 9' having a right angled end portion 10, the right angled end portion 10 being formed with a retainer 11 which is in the form of a cup, the open side of the retainer being disposed towards the body portion of the sewer trap. It will of course be understood that the free end of the end portion 10, is disposed on a line drawn horizontally through the center of the pipe within which the sewer trap is positioned.

Figure 2:
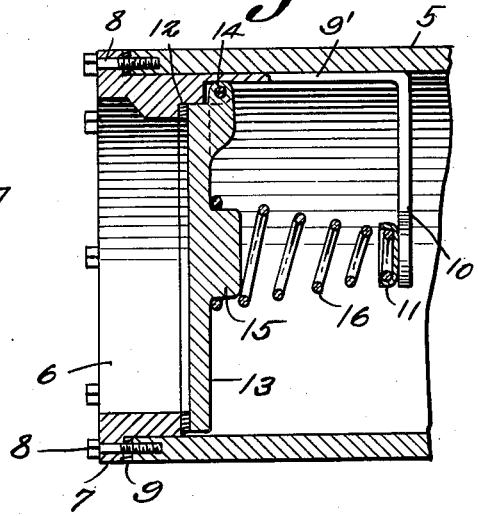
Figure 2 is a sectional view taken on line 2—2 of Figure 1.
Figure 3:
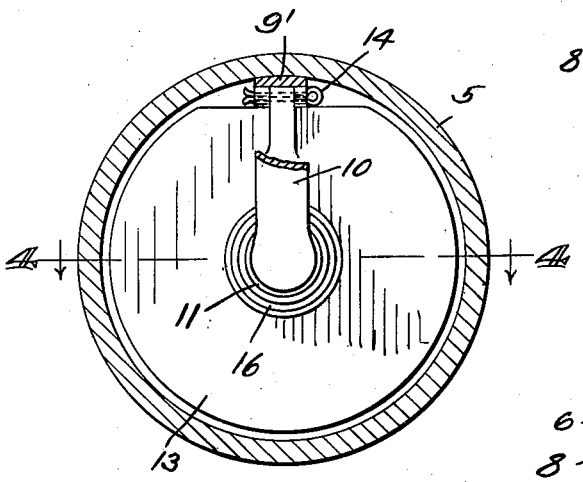
Figure 3 is a rear elevational view of the sewer trap, a portion of the bracket being broken away illustrating the pivotal connection between the closure and support.
Figure 4:
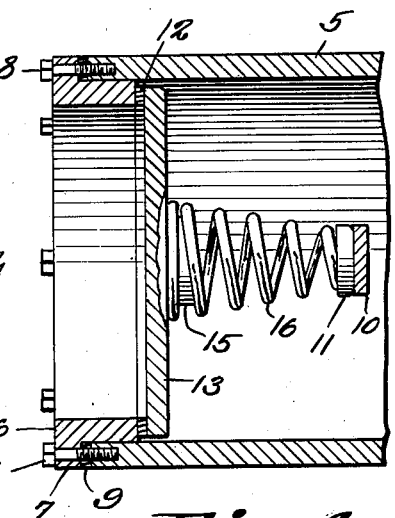
Figure 4 is a sectional view taken on line 4—4 of Figure 3.

As clearly shown by Figure 2 of the drawing, the inner edge of the body portion 6 is formed with a shoulder providing a seat for the washer 12 against which the closure 13 moves in providing a gas-tight fit between the closure and body portion.

The closure is disk-like in formation and has pivotal connection with the body portion 6, at 14.

Formed integral with the closure 13 is a circular lug 15 which is disposed centrally of the closure, the diameter of the lug being such that the large end of the coiled spring 16 may be fitted thereover, and held against lateral movement.

The coiled spring 16 tapers towards the right angled end portion 10 of the bracket that supports the spring, and is held within the retainer 11.

From the foregoing it will be seen that due to the construction shown and described, there is no obstruction present in the body portion of the sewer trap, and the coiled spring 16 is of the expansible type to urge the closure 13 to its seat, under normal conditions.

It might be further stated that in view of the construction of the sewer trap, the sewer trap may be used in pipe-lines, regardless of whether the pipe-lines are vertical, horizontal or disposed at angles.

What I claim is:

1. A sewer trap comprising a circular body portion adapted to be fitted in a pipe, a shoulder formed on the inner edge of the body portion providing a circular valve seat disposed in a true vertical plane, a closure, means for hingedly connecting the closure to the body portion, at the upper edge of the closure, an arm extending inwardly from the body portion and having a right angled end terminating on a line drawn centrally through the pipe in which the body portion is positioned, and a coiled spring disposed between the right angled end of the arm and closure, said spring adapted to normally urge the closure to its seat.

2. A sewer trap comprising a circular body portion adapted to be fitted in a pipe, an annular flange formed at the outer edge of the body portion, and adapted to fit against the end of the pipe in which the body portion is positioned, a valve seat disposed in a true vertical plane formed on the inner side of the body portion, an arm extending inwardly from the body portion and having a right angled end extending inwardly towards the center of the body portion, a lug formed on the closure and disposed centrally thereof, a coiled spring positioned over the lug and held to the closure by said lug, said coiled spring engaging the right angled end of said arm, and said coiled spring adapted to normally urge the closure to its seat.

PETER J. SCHWEIGHART.